Patented Dec. 11, 1951

2,577,816

UNITED STATES PATENT OFFICE 2,577,816

POLYETHYLENE-WAX COMPOSITIONS

Helmuth G. Schneider, Westfield, David W. Young, Roselle, and Julius P. Kocca, Linden, N. J., assignors to Standard Oil Development Company, a corporation of Delaware No Drawing. Application May 23, 1946, Serial No. 671,904

2 Claims. (Cl. 260—28.5)

This invention relates to polymeric compositions, relates particularly to strengthening paraffin wax mixtures; and relates especially to three component mixtures of paraffin wax, polyisobutylene and polyethylene of high strength and low tendency toward "blocking."

The high water resistance of paraffin wax has brought it into use as a waterproof coating or impregnating substance for preparing moistureproof packages, wrappers and similar uses, but paraffin alone has been found to be rather unsatisfactory; since if it is to be used alone the oil content in it must be very accurately controlled. Paraffin, which when applied to paper shows a reasonably good strength and reasonably good blocking properties can be made, but it requires extremely close factory control and the procedures are expensive, wasteful and time-consuming, since the "sweating" operation must be carried beyond the stage ordinarily used and must be stopped at a critical point. That is, if wax alone is to be used the oil content must be below about 0.5% and above about 0.2%. If the oil content is above about 0.5%, the wax "blocks" and if the oil content is below about 0.2% it has a very poor tensile strength.

Thus, paraffin wax, for paper coating to be used in automatic wrapping machinery must be very carefully prepared else the paper will yield trouble in the wrapping machinery because of the tendency towards "blocking" or the tensile strength of seals will be unsatisfactorily low. Many attempts have been made to overcome these defects, with only moderate success. The most successful of these attempts has been attained by the addition to the paraffin of substantial quantities of relatively high molecular weight polyisobutylene.

The tensile strength of paraffin wax has been considerably increased by the addition of polyisobutylene, which is readily soluble in and compatible with the paraffin wax, but this two-component mixture shows little or no improvement in "blocking" characteristics. In fact, while the addition of polyisobutylene substantially improves the tensile strength of paraffin wax, it shows a distinct tendency to reduce the temperature at which "blocking" occurs.

Polyethylene has been suggested as a component in wax mixtures but it has a relatively poor compatibility with paraffin wax, and when attempts are made to combine into the polyethylene any substantial amount of paraffin wax (or oil), no more than 10 to 12 per cent respectively can be worked into the polyethylene and larger amounts show the property of exuding or "bleeding," and the mixture shows very poor physical properties.

It is now found, however, that polyisobutylene will serve as a mutual solvent for the paraffin wax and the polyethylene.

Thus the invention produces a homogeneous 3-component solid solution mixture of paraffin wax, polyisobutylene and polyethylene which has a convenient melting point, is readily absorbed into paper and other fabrics, shows an excellent tensile strength and an excellent surface character of low adhesivity while retaining the property of thermosealing to yield a high strength, high water resistant seal for the production of wrappers of high water resistance and high strength. Thus, by the use of these threecomponent mixtures, it is possible to use a relatively inexpensive paraffin wax, with an oil content in a much wider percentage range; a much lower priced type of paraffin wax; while obtaining an excellent tensile strength by virtue of the presence of polyisobutylene and excellent non-blocking properties by virtue of the polyethylene, in a mixture in which each of the 3components serves as a mutual solvent for the other two. Accordingly, the rate of wax production in the plant need not be limited to the low value which otherwise must be had in order to prepare a satisfactory coating material. Other objects and details of the invention will be apparent from the following description.

The principal component of the composition of the present invention is paraffin wax; prepared as is well known to those skilled in the art by the chilling of hydrocarbon distillate to precipitate the wax, the filtering of the oil while cold to separate the wax from the lower freezing components and the "sweating" of the wax to raise the melting point to as high a value as possible. This sweated wax having a melting point between 126° F. and 145° F. is the principal component of the composition of the invention.

The second component is polyisobutylene. This is prepared by chilling isobutylene to a temperature within the range between 0° C. and —103° C. and the treatment of the liquid isobutylene, pure or in the presence of various diluents, refrigerants and the like, with a FriedelCrafts catalyst such as boron trifluoride. This polymerization process produces a polymer of isobutylene having a molecular weight range from 1,000 up to 500,000 (as determined by the Staudinger method). The preferred polymer is one having a Staudinger molecular weight number within the range between about 40,000 and 250,000, since the lower molecular weight materials do not yield as much strengthening effect as is desirable, and the higher molecular weight polymers are undesirably difficult to get into solution in the paraffin because of their rubbery character and resistance to solvents.

The third component of the mixture of the present invention is polyethene, prepared by compressing gaseous ethylene to temperatures ranging from 1,000 atmospheres to 5,000 atmospheres are higher, in the presence of traces of an oxygen type catalyst. The reaction is exothermic but is readily controlled by cooling coils and it produces a white, leathery substance which is slightly thermoplastic at elevated temperatures and highly insoluble in practically all solvents, hydrocarbon and others. The solubility and compatibility of this polymer with a paraffin wax-polyisobutylene mixture is most unexpected and surprising, in view of the insolubility of this polymer in hydrocarbons generally.

In preparing this composition of matter, the polyisobutylene and polyethylene may be milled together on the mill to obtain as intimate a mixture as possible, and the mixture of the two polymers may then be placed in a hot Werner and Pfleiderer type of kneader, to which the molten paraffin is added, very slowly at the beginning, practically at dropwise fashion to start with, until increasing amounts of paraffin wax are well incorporated into the mixed polymer and the material well softened, after which the rate of addition of the paraffin can be increased until the polymer is well in solution, whereafter the liquid mixture may be diluted with additional molten paraffin to the desired percentage and proportion composition.

The resulting mixture melts readily at temperatures between 120 and 150° C. and is readily incorporated into paper or other fabric material into which it is just as readily absorbed as is pure paraffin. In addition, when used as a wrapper the lapped edges are readily heat sealed to each other and the presence of the polyisobutylene markedly increases the strength of the mixture and the strength of the seal. At the same time, the presence of the polyethylene, by destroying the tackiness of the surface and the tendency toward pressure flow of the paraffin, substantially completely removes the "blocking" tendency, making it possible to stack printed impregnated and cut sheets of paper or fabric in piles for use in automatic wrapping machinery without danger of the stack forming a solid "block" in such a way as to prevent the feeding of the treated paper by automatic machinery to the wrapping station.

EXAMPLE I

Two mixtures were prepared, one consisting of 25 parts by weight of polybutene, having a Staudinger molecular weight number of 80,000, and 75 parts by weight of microcrystalline wax paraffin, and another consisting of 24.25 parts by weight of polybutene, 74.75 parts by weight of microcrystalline wax and one part by weight of polyethylene having a Staudinger molecular weight number of approximately 20,000. Test blocks were cast from these materials having approximately one inch cube dimensions. These blocks were then set individually upon a good grade of bond paper at 25° C. and 50% relative humidity and kept in contact with the paper on a smooth desk top for 24 hours. At the end of this time the blocks were lifted at the rate of 20 inches per minute, the paper not being held in any way to the desk surface. The sample without polyethylene showed sufficient adhesion to lift the paper from the desk, whereas the sample containing polyethylene did not lift the paper from the desk. (The paper sheets were 8½ x 11" in dimension.)

It may be noted that the tests of Example 1 show the improvement in slip between surfaces coated by the polymer; which, especially for automatic machinery, is vital. Attempts have been made to avoid "blocking" by the use of clay or talc, but such additional substances destroy the clearness of the film and very seriously reduce the water resistant properties with only a minor gain in slip from the stack. In contrast, the composition of the present invention does not suffer in water resistance; gains very greatly in slip, does not suffer substantially in tensile strength and remains clear.

EXAMPLE 2

A series of blends were prepared from wax as before, with 80,000 molecular weight polyisobutylene and 20,000 molecular weight polyethylene. The blends were made in a Baker-Perkins kneader at about 125° to 160° C. After the high molecular weight polymers had been well mixed in the 132° F. M. P. wax, the blends were tested for tensile strength. Results are listed in Table I:

Table I

|  | 132° F. M. P. Wax | 1 | 1a | 1b | 2 | 2a | 2b | 3 | 3a | 3b |
|---|---|---|---|---|---|---|---|---|---|---|
| Per cent Polyethylene | | 0.25 | 0.50 | 1.00 | | | | 0.125 | 0.25 | 0.50 |
| Per cent Polyisobutylene | | | | | 0.25 | 0.50 | 1.00 | 0.125 | 0.25 | 0.50 |
| Tensile Strength (#/¼ sq. in.) | 59 | 59 | 62 | 66 | 86 | 86 | 93 | 72 | 79 | 81 |
| Blocking tem. of wax | 94 | 99 | 110 | 118 | 93 | 91 | 90 | 99 | 112 | 115 |

This test shows that the tensile strength of the polyethylene-polyisobutylene-wax mixture was greater than the polyethylene-wax mixture. For example, 0.5% polyethylene in wax gave a tensile of 62 lbs./¼ sq. in., while a blend of 0.25% polyethylene and 0.25% polyisobutylene in wax (a total of 0.5% polymer) gave a tensile of 79 lbs./¼ sq. in. Also, the blocking temperature of the wax was improved by blending polyethylene and polyisobutylene in the wax.

The above examples show a three component mixture in which the solubilizing agent is polybutene. This, however, is not necessary since the solubilization may be accomplished by the use of other agents, particularly chlorine or hydrogen. Either the paraffin wax or the polyethylene may be treated with chlorine in relatively small proportions, such as 2% to 8%, to yield a slightly chlorinated product by which the necessary solubilization is accomplished.

EXAMPLE 3

Blends were made up with 20,000 molecular weight polyethylene varying in amount from 0.5

*Table IV*

| Blend No. | A'' | B'' | C'' | D'' |
|---|---|---|---|---|
| 132° F. M. P. Wax......per cent.. | 95 | 95 | 95 | 97 |
| 210,000 M. Wt. Staudinger Polyisobutylene......per cent.. | 3 | 3 | 3 | 0 |
| 20,000 M. Wt. polyetheylene...do.... | 2 | 1.5 | 1.0 | 2 |
| 2, 6 di-tert. butyl-p-cresol...do.... | 0 | 0.5 | 1.0 | 1 |
| Color of blend after three hours at 150–175° C. | brown | colorless | colorless | colorless |
| Odor | slight | none | none | none |
| Appearance of blend | smooth | smooth | smooth | not smooth | to 50% in chlorinated wax. The chlorinated wax had a melting point of 130° F. Chemical tests showed that the wax contained 2.8% Cl by analysis. The polymer blends were made by using mechanical agitation and holding the temperature at 150° C. for about 1 hour. Results of the polymer blends are given in Table II:

*Table II*

| Blend No. | A | B | C | D | E | F | G |
|---|---|---|---|---|---|---|---|
| Percent 20,000 M. Wt. Polyethylene in wax. | 1 | 3 | 5 | 10 | 20 | 30 | 50 |
| Percent Cl in wax | 2.8 | 2.8 | 2.8 | 2.8 | 2.8 | 2.8 | 2.8 |
| M. Pt. of Cl wax.°F | 130 | 130 | 130 | 130 | 130 | 130 | 130 |
| Appearance of Blends | Smooth | smooth | smooth | smooth | smooth | smooth | smooth |
| Color of Blends | Brown | brown | brown | brown | brown | brown | brown |

When blends were made under the same conditions (using 20,000 m. wt. polyethylene and wax) it was found that at a concentration above 5% of 20,000 m. wt. polyethylene the polymer separated from the wax and smooth blends could not be made. These tests indicated the value of the chlorine in the wax to improve the solubility of polyethylene in the system.

Qualitative tests have indicated that polyethylene is very soluble in chlorinated polybutene, halogenated polypropylene, halogenated butyl rubber, and halogenated polyethylene.

EXAMPLE 4

In making the blends of Example 3, the wax darkened after heating for 15 minutes at about 150° C. A number of blending tests indicated that the addition of 0.1% to 1.0% of 2,6 di-tert butyl-p-cresol maintained color stability of the blends. Experimental results are given in Table III:

*Table III*

[Effect of 2, 6 di-tert butyl-p-cresol on color stability of blends.]

| Blend No. | A' | B' | C' | D' |
|---|---|---|---|---|
| Percent 20,000 M. Wt. polyethylene in wax | 1 | 3 | 5 | 10 |
| Percent Cl in wax | 2.8 | 2.8 | 2.8 | 2.8 |
| M. Pt. of wax °F | 130 | 130 | 130 | 130 |
| Time of mixing hours | 1 | 1 | 1 | 1 |
| Temp. of mixing °C | 140–150 | 140–150 | 140–150 | 140–150 |
| Appearance of blend | Smooth | smooth | smooth | smooth |
| Color of blend | (1) | (1) | (1) | (1) |
| Percent 2,6 di-tert butyl-p-cresol in blend | 0.5 | 0.2 | 0.1 | 0.1 |

[1] Very light tan.

Results in Example 4 and Example 3 indicate the value of 2,6 di-tert butyl-p-cresol as a color stabilizer for polymer-halogenated wax blends.

EXAMPLE 5

Blends were made in a Baker-Perkins type kneader at 150 to 175° C. Time in the kneader was held constant—that is three hours. Composition of the blends are given in Table IV:

The results shown in Example 5 indicate the value of polyisobutylene in producing smooth soluble blends of polyethylene in wax. Also, these data indicate the value of 2,6 di-tert. butyl-p-cresol in maintaining color stability in the wax polymer blends.

Similarly, hydrogen present during the polymerization of the ethylene serves as a solubilizing agent, and the modified polymers of ethylene also are soluble in paraffin.

Polyethylene modified by the hydrogenation procedure shown in U. S. Patent No. 2,387,755 also shows an excellent compatibility in polyisobutylene-wax mixtures, the hydrogenated showing a higher co-solubility than the simple polyethylene.

Accordingly, the invention provides a composition of matter consisting of paraffin wax, polyethylene and a solubilizer in the form of polyisobutylene or hydrogen or chlorine, by which the strength of the paraffin wax is markedly increased and its tackiness and blocking tendencies markedly decreased to yield a material which in film form or impregnated into paper or other fabric yields a wrapper of high water resistance and high tensile strength, in which the tackiness and blocking tendencies are sufficiently low to permit the material to be used in automatic wrapping machinery.

While there are above described but a limited number of embodiments of the composition of the invention, it is possible to produce still other embodiments without departing from the inventive concept herein disclosed, and it is therefore desired that only such limitations be imposed upon the appended claims as are stated therein or required by the prior art.

The invention claimed is:

1. A composition of matter comprising 1 to 50% of polyethylene in chlorinated wax containing 2 to 8% chlorine.

2. A composition of matter comprising 1 to 50% of polyethylene having a molecular weight of about 20,000 in chlorinated wax having a melting point of 130° F. and containing 2.8% chlorine.

HELMUTH G. SCHNEIDER.
DAVID W. YOUNG.
JULIUS P. ROCCA.

(References on following page)

REFERENCES CITED

The following references are of record in the file of this patent:

UNITED STATES PATENTS

| Number | Name | Date |
|---|---|---|
| 2,229,356 | Wiezevich | Jan. 21, 1941 |
| 2,265,582 | Stevens et al. | Dec. 9, 1941 |
| 2,298,846 | Skooglund | Oct. 13, 1942 |
| 2,307,057 | Mitchell | Jan. 5, 1943 |
| 2,339,958 | Sparks | Jan. 25, 1944 |
| 2,453,644 | Steinkraus | Nov. 9, 1948 |

OTHER REFERENCES

Chemical Industries, vol. 54, February 1944, pp. 203–205.

British Plastics, May 1945, pp. 213–214.